United States Patent
Deguchi (10) Patent No.: US 6,169,612 B1
(45) Date of Patent: Jan. 2, 2001

(54) IMAGE PROCESSOR PROVIDED WITH DOCUMENT DETECTING MEANS

(75) Inventor: Hiroyuki Deguchi, Osaka (JP)

(73) Assignee: Kyocera Mita Corporation, Osaka (JP)

( * ) Notice: Under 35 U.S.C. 154(b), the term of this patent shall be extended for 0 days.

(21) Appl. No.: 08/274,158

(22) Filed: Jul. 14, 1994

Related U.S. Application Data (63) Continuation of application No. 07/737,062, filed on Jul. 29, 1991, now abandoned.

(30) Foreign Application Priority Data

Jul. 30, 1990 (JP) ................................................. 2-199332

(51) Int. Cl.[7] ............................. H04N 1/04; H04N 1/00; H04N 1/46
(52) U.S. Cl. .......................... 358/488; 358/406; 358/509
(58) Field of Search ..................................... 358/488, 474, 358/406, 475, 480, 497, 296, 505, 509

(56) References Cited

U.S. PATENT DOCUMENTS

| | | | |
|---|---|---|---|
| 4,025,184 | * 5/1977 | Mochizuki | 355/10 |
| 4,568,181 | 2/1986 | Nishiyama | 355/75 |
| 4,716,438 | 12/1987 | Farrell | 355/6 |
| 4,811,047 | * 3/1989 | Hosaka et al. | 355/7 |
| 4,862,284 | * 8/1989 | Murata | 358/474 |
| 4,939,553 | * 7/1990 | Sato et al. | 355/311 |
| 4,963,934 | * 10/1990 | Nezu | 355/230 |
| 4,974,022 | 11/1990 | Nezu | 355/230 |
| 5,036,354 | * 7/1991 | Miyamoto | 355/311 |
| 5,065,185 | * 11/1991 | Powers et al. | 355/208 |
| 5,150,159 | * 9/1992 | Igawa et al. | 355/243 |

FOREIGN PATENT DOCUMENTS

| | | | |
|---|---|---|---|
| 3804312 | 8/1989 | (DE) . | |
| 3925918 | 2/1990 | (DE) . | |
| 0078266 | * 5/1982 | (JP) | 358/488 |
| 0078270 | * 5/1982 | (JP) . | |
| 2086068 | * 5/1982 | (GB) . | |
| 0111474 | * 7/1983 | (JP) | 358/488 |
| 59-068728 | 7/1984 | (JP) . | |
| 59-123835 | 11/1984 | (JP) . | |
| 59-188634 | 3/1985 | (JP) . | |
| 59188635 | * 5/1985 | (JP) . | |
| 0033778 | * 7/1985 | (JP) | 358/488 |
| 62-221265 | * 9/1987 | (JP) . | |
| 62-221266 | * 9/1987 | (JP) . | |
| 63-041842 | 7/1988 | (JP) . | |
| 02284574 | * 11/1990 | (JP) . | |
| 04339460 | * 11/1997 | (JP) . | |

* cited by examiner

Primary Examiner—Madeleine Nguyen
(74) Attorney, Agent, or Firm—Antonelli, Terry, Stout & Kraus, LLP (57) ABSTRACT

An image processor has a transparent plate on which a document is placed, and a document cover which covers the document placed thereon. The document cover moves freely between a closed position at which it covers the transparent plate and the document placed thereon and an open position at which it permits the transparent plate to be exposed. Provision is further made of a document illumination source which moves relative to the document placed on the transparent plate, and an image sensor which receives light irregularly reflected by the document that is illuminated by the document illumination source. The image processor further has a document detector which detects the region of the transparent plate where the document exists based on an output signal from the image sensor. The document covering surface of the document cover has a regular reflectance of from 1.5 to 40% and gives a relative intensity of irregularly reflected light as received by the image sensor of from N2.5 to N8.5 in terms of lightness in the Munsell color system. The document detector discriminates whether a document exists on the region of the transparent plate or not in a different manner depending upon whether the document cover is at the closed position or whether the document cover is at the open position.

21 Claims, 5 Drawing Sheets

IMAGE PROCESSOR PROVIDED WITH DOCUMENT DETECTING MEANS

This application is a continuation of application Ser. No. 07/737,062, filed on Jul. 29, 1991 now abandoned.

FIELD OF THE INVENTION

The present invention relates to a document processor such as an electrostatic copying machine, a facsimile or a document reader, and more specifically to a document processor provided with document detecting means which detects the existing region of a document that is placed on a transparent plate.

DESCRIPTION OF THE PRIOR ART

As is well known, a document processor put into practical use comprises a transparent plate on which a document is placed, a document covering means which covers the document placed on the transparent plate, a document illumination source which illuminates the document placed on the transparent plate, and an image sensor which receives the light irregularly reflected from the document that is illuminated by the document illumination source. The document covering means is constituted by an ordinary document covering member or by a portion of the document carrier means which brings the document onto the transparent plate and then carries it out from the transparent plate. The above document cover is usually disposed to freely swing between a closed position at which it covers the transparent plate and the document placed thereon and an open position at which it permits the transparent plate to be exposed. For scanning the document, the document illumination source moves relative to the document that is placed on the transparent plate. The image sensor is conveniently constituted by a CCD that has a number of elements arranged in a predetermined direction. In the case of a color image processor, there can be used a CCD that includes an R element for receiving red light, a G element for receiving green light and a B element for receiving blue (or violet) light.

Japanese Laid-Open Patent Publication Nos. 68728/1984 and 41842/1988 disclose an image processor of the above-mentioned form which is provided with a document detecting means which detects a document-existing region (i.e. detects the region on which a document is placed on the transparent plate and the size of the said document) on the basis of output signals from the image sensor. According to the image processors disclosed in the above publications, the document covering surface of the document covering means has a mirror surface or a half-mirror surface having a regular reflectance of 60 to 90% in order to discriminate between a document-existing region, i.e., a region where the document exists on the transparent plate, and a no document-existing region, i.e. a region where there exists no document, and in consequence, the document covering surface of the document cover is illuminated through the transparent plate, based on the output signals from the image sensor.

When the document covering surface of the document cover is made to have a mirror surface or a half-mirror surface, the light is irregularly reflected in very small amounts by the document covering surface, and the image sensor receives the irregularly reflected light in small amounts. On the other hand, the surface of the ordinary document usually has a considerably small regular reflectance. Hence, the surface irregularly reflects the light in considerable amount, and so the image sensor receives the irregularly reflected light in considerable amount. Therefore, the document detecting means can detect the document-existing region on the basis of the output signals from the image sensor that change in proportion to the intensity of the received light.

The surface of the ordinary document usually has a considerably small light absorption, and a considerable amount of the light that is irradiated is reflected regularly or irregularly. However, when the document is a copied document, the document often contains so-called solid portions, which are black all over, at the end edges or side edges thereof. The solid portions have a very high light absorption; i.e., only very little light is reflected by the portions which are black all over, and very little light is irregularly reflected, just like the case of the document covering surface having a mirror surface or a half-mirror surface. Also, when the document is an ordinary photograph that has a slightly high regular reflectance, if the photograph contains a dark color portion in the background of the subject, the irregular reflection light is very small because of reduction of irregular reflection light due to regular reflection and absorption of light by the dark color portion. This fact causes the conventional image processor to erroneously discriminate the solid portions of the document or the photographic document as being the document covering surface (i.e. the no document-existing region) of the document covering means.

SUMMARY OF THE INVENTION

The main technical assignment of the present invention is to provide an improved image processor which is capable of detecting the document as desired without erroneously discriminating the document from the document covering surface of the document covering means, i.e. from the region where there exists no document, regardless of whether the document contains portions that are "black all over" or whether the document is a photograph.

Another technical assignment of the present invention is to provide an improved image processor which, though not satisfactorily, is capable of detecting the document even when the image processor is operated without location of the document covering means at the closed position at which it should cover the transparent plate and the document that is placed on the transparent plate. (In this case, however, there remains the probability that a solid portion of the document might be erroneously discriminated to be the region where there exists no document, like with the conventional image processors).

In order to achieve the above-mentioned main technical assignment according to the present invention, the document cover has a document covering surface which has a regular reflectance of from 1.5 to 40% and gives a relative intensity of irregular reflectance light as received by the image sensor of from N2.5 to N8.5 in terms of lightness in the Munsell color system.

In order to achieve the above-mentioned other technical assignment according to the present invention, whether there exists a document on the region or not is discriminated in a different manner depending upon whether the document covering means is at the closed position at which it covers the transparent plate and the document placed thereon or whether the document covering means is at the open position at which it permits the transparent plate and the document placed thereon to be exposed.

That is, in order to achieve the above-mentioned main technical assignment according to the present invention, there is provided an image processor comprising a transparent plate on which a document is placed, a document cover which covers the document placed on the transparent plate, a document illumination source which moves relative to the document that is placed on the transparent plate, an image sensor which receives the light irregularly reflected from the document that is illuminated by the document illumination source, and a document detecting means which detects the document-existing region based on an output signal from the image sensor, wherein a document covering surface of the document cover has a regular reflection factor of from 1.5 to 40% and gives a relative intensity of irregularly reflected light as received by the image sensor of from N2.5 to N8.5 in terms of lightness in the Munsell color system.

In order to achieve the above-mentioned other technical assignment according to the present invention, there is provided an image processor comprising a transparent plate on which a document is placed, a document cover which is disposed to freely move between a closed position at which it covers the transparent plate and the document placed thereon and an open position at which it permits the transparent plate to be exposed, a document covering means detecting means which detects whether the document cover is located at the closed position or not, a document illumination source which moves relative to the document placed on the transparent plate, an image sensor that receives light irregularly reflected from the document that is illuminated by the document illumination source, and a document detecting means which detects the region where the document exists on the basis of an output signal from the image sensor, wherein a document covering surface of the document cover has a regular reflectance of from 1.5 to 40% and gives a relative intensity of irregularly reflected light as received by the image sensor of from N2.5 to N8.5 in terms of lightness in the Munsell color system, and wherein said document detecting means detects whether a document is present in the region or not in different manners depending upon whether the document covering means is at the closed position or whether the document cover is at the open position.

The document covering surface of the document covering means is substantially achromatic, and preferably has a regular reflection factor of from 1.5 to 20%, particularly from 2 to 15%, and further gives a relative intensity of irregularly reflected light as received by the image sensor of preferably from N4 to N8.5, particularly from N5.5 to N7.5, in terms of lightness in the Munsell color system.

The relative intensity of irregularly reflected light as received by the image sensor is a relative value that is calculated from the intensity of irregularly reflected light received by the image sensor at the time when a document having a surface of a predetermined lightness in the Munsell color system is used.

According to the image processor of the present invention, there is little probability that the surface of a document is erroneously discriminated to be the document covering surface of the document covering means, since the document covering surface of the document covering means has a regular reflectance of from 1.5 to 40% and gives a relative intensity of irregularly reflected light as received by the image sensor of from N2.5 to N8.5 in terms of lightness in the Munsell color system.

According to a study by the present inventors, in most documents, relative intensities of irregularly reflected light as received by the image sensor are smaller than N2.5 (particularly N4 or more particularly N5.5) or greater than N8.5 (particularly N7.5) in terms of lightness in the Munsell color system. In view of the above fact, the image processor of the present invention employs the document covering means having a document covering surface that gives a relative intensity of irregularly reflected light as received by the image sensor of from N2.5 to N8.5 in terms of lightness in the Munsell color system.

When the document covering surface of the document covering means has a regular reflectance which is smaller than 1.5% and the relative intensity of irregularly reflected light as received by the image sensor is relatively great, i.e., for example, greater than N8.5 in terms of lightness in the Munsell color system, the light is irregularly reflected in an excess amount by the document covering surface of the document covering means, and it becomes difficult to discriminate the document covering surface of the document covering means from white portions on the surface of the document. Furthermore, when the document covering surface of the document covering means has a regular reflectance which is smaller than 1.5% and gives a relative intensity of irregularly reflected light as received by the image sensor which is relatively small, i.e., for example, smaller than N4 in terms of lightness in the Munsell color system, and further when the document is a transparent or semitransparent one such as a tracing paper, the light that has passed through the document is mostly absorbed by the document covering surface of the document covering means. Consequently, there is the probability that the surface of the document may be recognized and reproduced as black or grey color. On the other hand, when the regular reflectance of the document covering surface of the document covering means is greater than 40%, the irregular reflection light from the document covering surface of the document covering means is very small like the case of the conventional image processor, and it becomes difficult to discriminate the document covering surface of the document covering means from the solid portions of the document. In view of this fact, in the image processor of the present invention the regular reflectance of the document covering surface of the document covering means is set to be from 1.5 to 40%.

When the image processor is operated without the document covering means located at the closed position, there does not substantially exist any irregular reflection light in the region where there is no document. In this case, whether there exists a document in the region or not can be discriminated based on whether the irregularly reflected light as received by the image sensor is smaller than a predetermined value, which is a considerably small value, or not. In this case, however, when there exist solid portions on the surface of the document, there still remains the probability that the solid portions might be erroneously discriminated as the region where there is no document, like in the conventional image processors.

DETAILED DESCRIPTION OF PREFERRED EMBODIMENTS

Preferred embodiments of the present invention will now be described in detail with reference to the accompanying drawings.

Figure 1:
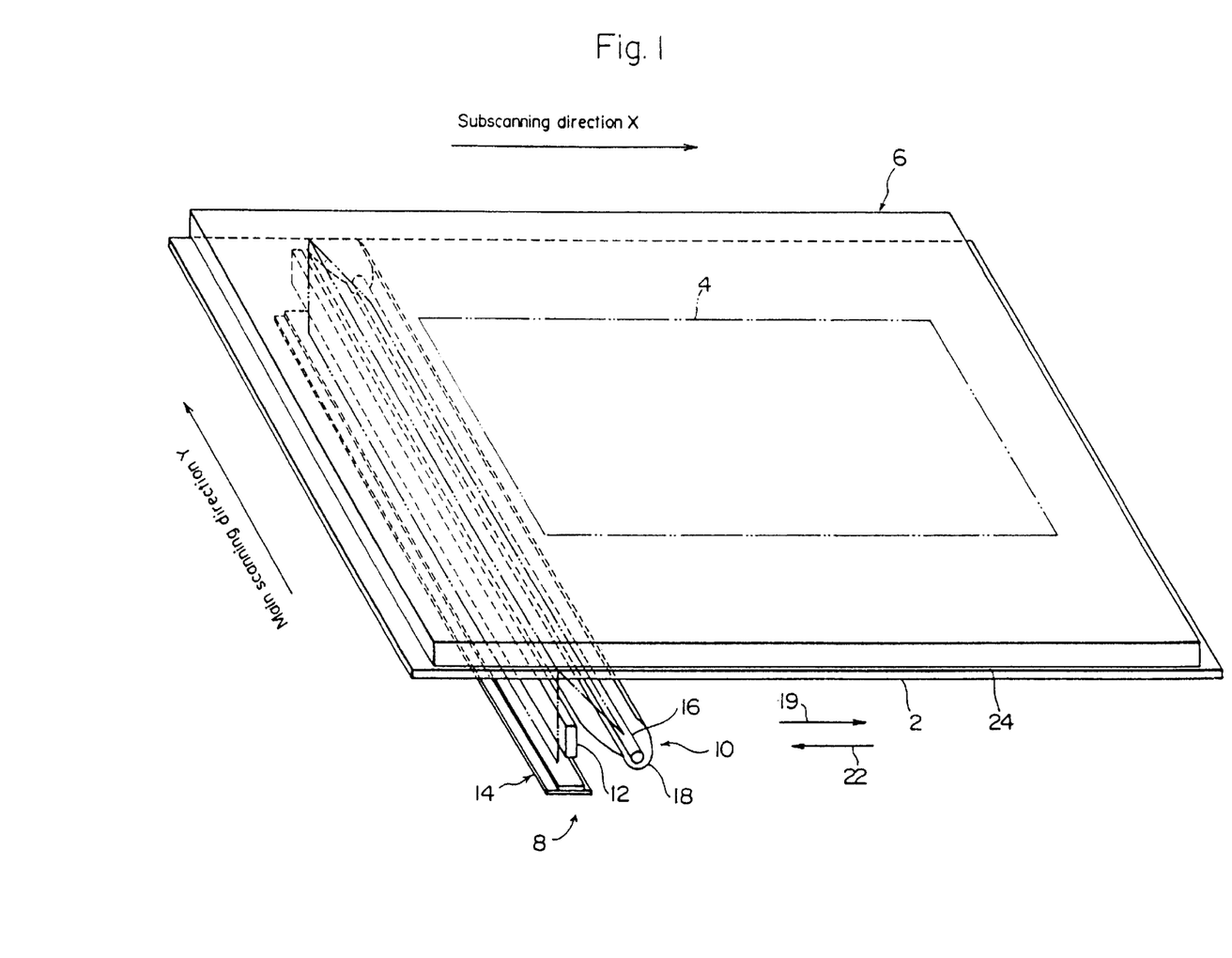
FIG. 1 is a partial perspective view showing principal constituent elements of interest in a copying machine which includes an embodiment of the image processor constituted according to the present invention.
Figures 2, 3:
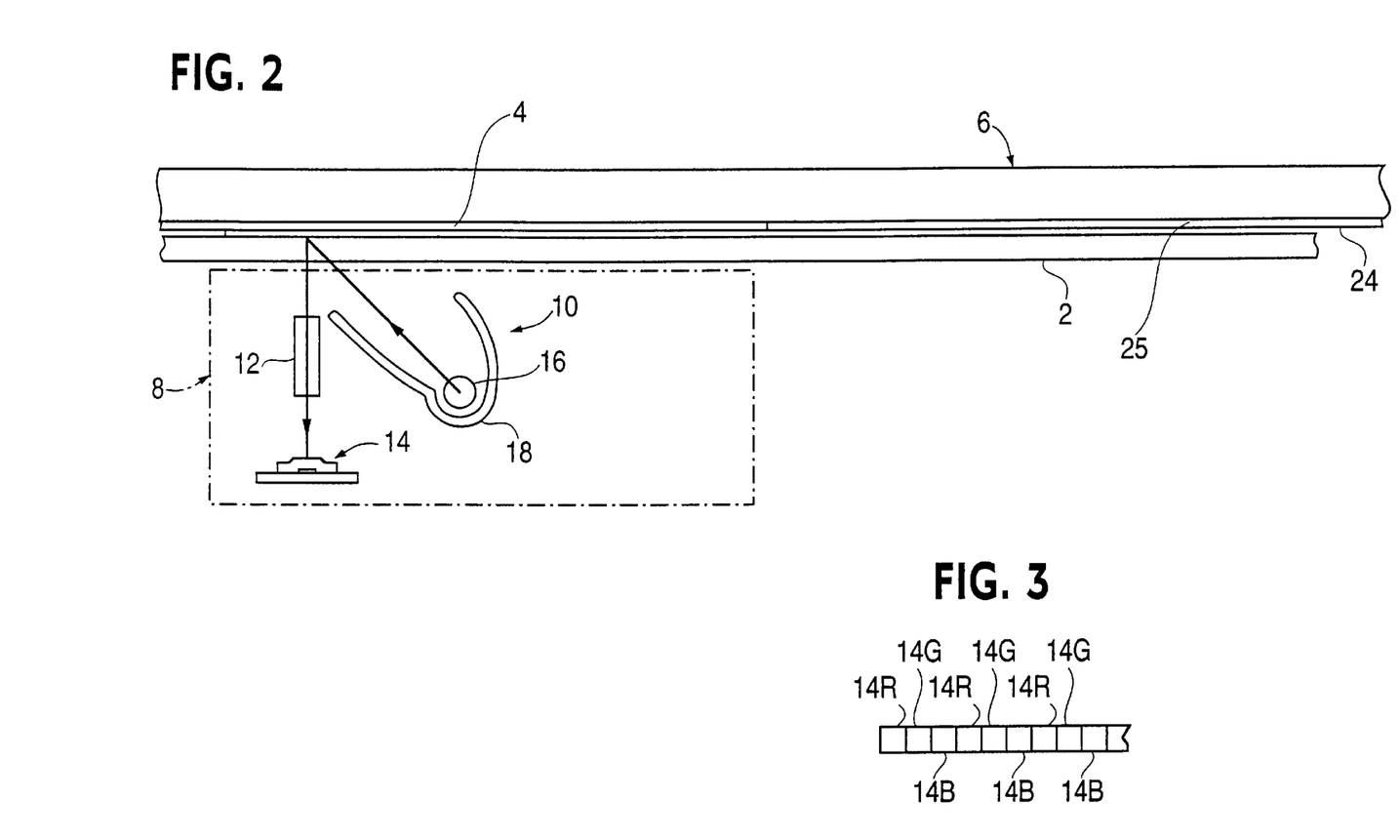
FIG. 2 is a partial sectional view showing the principal constituent elements of FIG. 1.
FIG. 3 is a partial simplified view showing, on an enlarged scale, part of the image sensor used in the copying machine of FIG. 1.

FIGS. 1 and 2 illustrate part of a digital color electrostatic copying machine which is an embodiment of the image processor constituted according to the present invention. The copying machine has a transparent plate 2 which is made of a rectangular glass plate. A document 4 to be copied is placed on this transparent plate 2. A document covering means 6 is disposed in relation to the transparent plate 2. The diagramed document covering means 6 is made up of an ordinary document covering member that is mounted to turn on a pivot that extends along the rear edge thereof, and turns between a closed position that is diagramed in FIGS. 1 and 2, at which it covers the transparent plate 2 and the document 4 placed thereon, and an open position at, which it permits the transparent plate 2 and the document 4 placed thereon to be exposed.

Under the transparent plate 2 is disposed an image reader scanning unit that is generally designated at 8. The unit 8 includes a document illumination means 10, a lens array 12 and an image sensor 14. The document illumination source 10 has an illumination lamp 16 that extends in the direction of width (in the direction perpendicular to the surface of paper in FIG. 2) and a reflector plate 18 which also extends in the direction of width. The lens array 12 has a number of rod lenses (e.g., lenses commercially available under the trade name of "Selfoc Lens Array") that are set in the direction of width. The image sensor 14 is constituted by a CCD in which a number of imaging elements are set in array in the direction of width. The diagramed copying machine is a digital color copying machine, wherein the image sensor 14 consists of R elements 14R, G elements 14G and B elements 14B that are repetitively set in an array in this order, as shown in FIG. 3. The R element 14R has a filter that permits the passage of red light only, and receives red light only that has passed through this filter. The G element 14G has a filter that permits the passage of green light only, and receives green light only that has passed through this filter. The B element 14B has a filter that permits the passage of blue (or violet) light only, and receives blue (or violet) light only that has passed through this filter.

In the copying machine that is diagramed, with the document covering means 6 located at the open position so that the transparent plate 2 is exposed, the document 4 to be copied is placed on the transparent plate 2 and, then, the document covering means 6 is located at the closed position to cover the transparent plate 2 and the document 4 placed thereon. When the document 4 consists of a given page of a relatively thick book, the document covering means 6 may be kept at the open position instead of bringing it to the closed position. After the preparation is thus completed, a copy start switch (not diagramed) is depressed. Then, the image reader scanning unit 8 starts moving for scanning in a direction indicated by arrow 19 to read the document image. The document illumination source 10 of the image reader scanning unit 8 illuminates the document 4 placed on the transparent plate 2, and the image sensor 14 receives, via lens array 12, part of the light irregularly reflected by the document 4 instead of the regular reflection light from the document 4. A number of the elements 14R, 14G and 14B in the image sensor 14 produce output signals (voltages) successively to carry out the scanning in the main scanning direction Y, and the scanning is carried out in the subscanning direction X, as the image reader scanning unit 8 moves in the direction indicated by arrow 19. The signals produced by a number of the elements 14R, 14G and 14B of the image sensor 14 are fed to a central processing unit (CPU) 20 (FIG. 4) which suitably processes the signals to form output signals that are necessary for forming a color image. When the image reader unit 8 reaches a predetermined position in the direction indicated by arrow 19, the image reader unit 8 discontinues the scanning and then moves back in the reverse direction, i.e., returns in a direction indicated by arrow 22. While the image reader unit 8 performs the scanning operation one time, all of the signals produced by the R elements 14R, G elements 14G and B elements 14B, i.e., all of the signals necessary for forming a color image, are suitably processed and are stored. Alternatively, the scanning operation of the image reader unit 8 is repeated three times, and the signals formed by the R elements 14R, signals formed by the G elements 14G and signals formed by the B elements 14B are successively processed and are stored. As required, it is also possible to move the transparent plate 2 instead of moving the image reader unit 8, so that the document 4 and the image reader unit 8 are moved in relation to each other.

The above-mentioned constitution in the diagrammed copying machine has been known already in a digital color copying machine, and therefore, it is not described in more detail in this specification.

In the present invention, what is important is that the document covering surface (i.e., lower surface 24 in FIGS. 1 and 2) of the document covering means 6 has particular characteristics. That is, it is important that the document covering surface 24 have a regular reflectance of from 1.5 to 40%, preferably from 1.5 to 20% and, especially preferably from 2 to 15%. Moreover, it is important that the relative intensity of irregularly reflected light on the document covering surface 24 as received by the image sensor 14 be from N2.5 to N8.5, preferably from N4 to N8.5 and, especially preferably from N5.5 to N7.5, in terms of lightness in the Munsell color system. Examples of material that satisfy such characteristics include special films (films specially treated on their front or back surfaces) put into the market by Nichiei Kako Co., Japan, such as a film (cancellation marked film) sold under the trade name of "NE-tak.VAM-1" or a film (hair-lined film) sold under the trade name of "NE-tak.HM-100". Such a special film 25 is stuck to the document covering surface 24 of the document covering means 6 so that the document covering surface 24 will exhibit desired characteristics.

Figure 4:
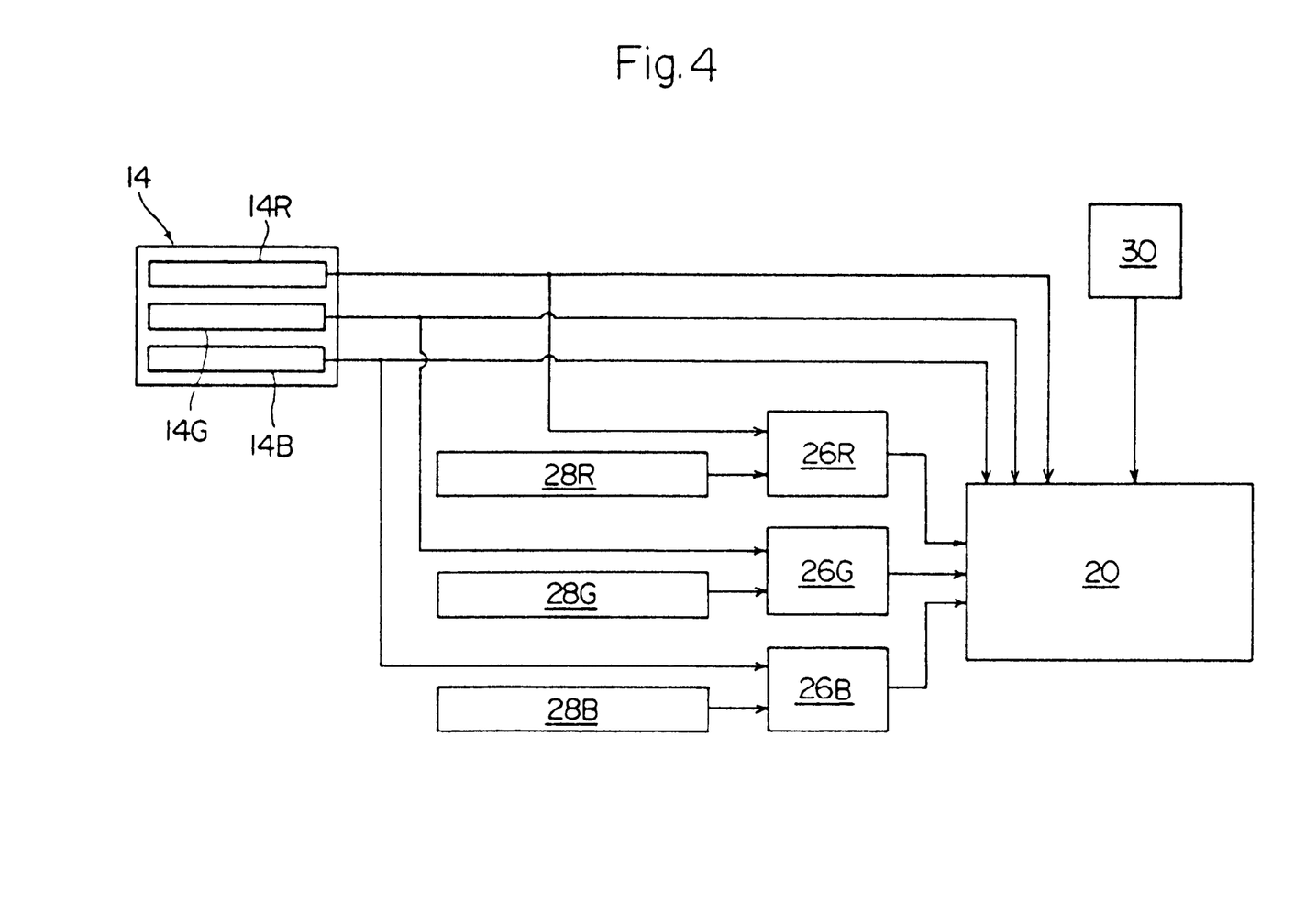
FIG. 4 is a simplified block diagram showing electric and electronic elements in the copying machine of FIG. 1.
Figure 5:
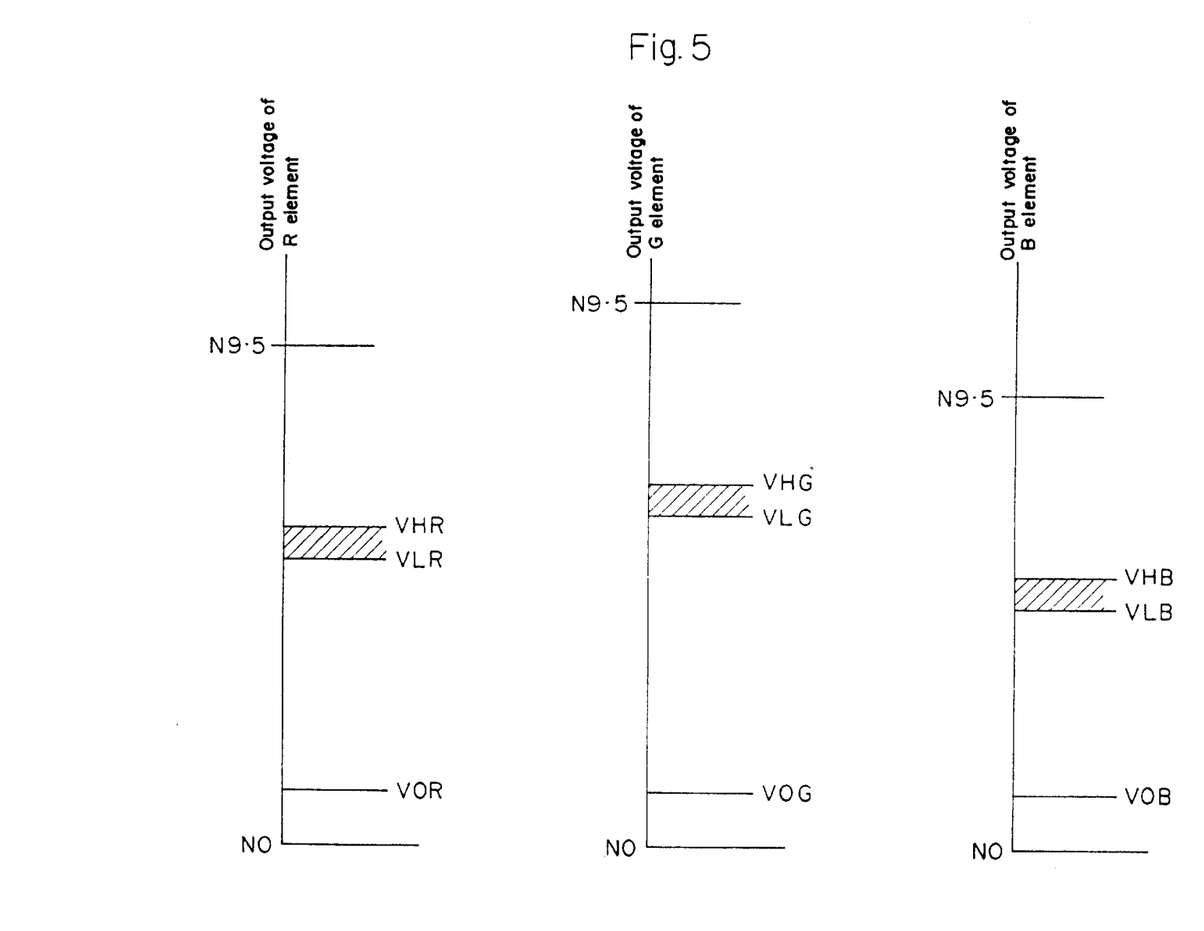
FIG. 5 is a simplified diagram showing reference voltage signals used for detecting the document in the copying machine of FIG. 1.

Description will be continued with reference to FIG. 4. In the diagramed embodiment constituted according to the present invention, three comparators 26R, 26G and 26B are arranged in relation to the document covering surface 24 of the document covering means 6 that has the aforementioned particular characteristics. The comparator 26R is fed with an output voltage from the R element 14R in the image sensor 14, the comparator 26G is fed with an output voltage from the G element 14G in the image sensor 14, and the comparator 26B is fed with an output voltage from the B element 14B in the image sensor 14. In the diagramed embodiment, furthermore, there are provided an R reference voltage setting circuit 28R, a G reference voltage setting circuit 28G, and a B reference voltage setting circuit 28B in relation to the comparators 26R, 26G and 26B. Referring to FIG. 5 together with FIG. 4, the R reference voltage setting circuit 28R feeds to the comparator 26R three reference voltages VHR, VLR and VOR that can be suitably adjusted. The G reference voltage setting circuit 28G feeds to the comparator 26G three reference voltages VHG, VLG and VOG that can be suitably adjusted. The B reference voltage setting circuit 28B feeds to the comparator 26B three reference voltages VHB, VLB and VOB that can be suitably adjusted. In FIG. 5, the ordinate represents the relative intensity of irregularly reflected light as received by the elements 14R, 14G and 14B of the image sensor 14 in terms of lightness in the Munsell color system, and in the ordinate NO represents a voltage (zero voltage corresponding to intensity zero of irregularly reflected light that is received) outputted by the elements 14R, 14G and 14B of the image sensor 14 when a document having lightness NO (perfect black) in the Munsell color system is placed on the transparent plate 2 and is illuminated by the document illumination source 10, while N9.5 represents a voltage (corresponding to the intensity of irregularly reflected light that is received) outputted by the elements 14R, 14G and 14B of the image sensor 14 when a white document having lightness N9.5 in the Munsell color system is placed on the transparent plate 2 and is illuminated by the document illumination source 10. For instance, when the document covering surface 24 of the document covering means 6 is formed of the above-mentioned cancellation marked film (trade name "NE-tak.VAM-1") which is achromatic having a regular reflectance of 5.8% and giving a relative intensity of irregularly reflected light as received by the image sensor 14 of N7 in terms of lightness in the Munsell color system, VHR can be set to a voltage that corresponds to about N7.5, VLR can be set to a voltage that corresponds to about N6.5, VOR can be set to a voltage that corresponds to about N1, VHG can be set to a voltage that corresponds to about N7.5, VLG can be set to a voltage that corresponds to about N6.5, VOG can be set to a voltage that corresponds to about N1, VHB can be set to a voltage that corresponds to about N8.0, VLB can be set to a voltage that corresponds to about N6.0, and VOB can be set to a voltage that corresponds to about N1 (output voltage of the B element 14B is smaller than the output voltages or R element 14R and G element 14G and can, hence, be erroneously detected and, because of this reason, VHB is set to about N8.0 instead of about N7.5, and VLB is set to about N6.0 instead of about N6.5). Apparent differences in scale in the ordinates for the R element 14R, the G element 14G, and the B element 14B are due to differences in sensitivities in the respective elements. In the comparators 26R, 26G and 26B, the voltages fed from the corresponding elements 14R, 14G and 14B in the image sensor 14 are compared with reference voltages fed from the corresponding reference voltage setting circuits 28R, 28G and 28B, and the results are outputted to the central processing unit 20. As will be described later in further detail, the central processing unit 20 detects the document or, more specifically, detects the place of the transparent plate 2 on which the document is placed as well as the shape and size of the document 4 on the basis of signals fed from the comparators 26R, 26G and 26B. Therefore, the comparators 26R, 26G and 26B, the reference voltage setting circuits 28R, 28G and 28B, and the central processing unit 20 constitute a document detecting means.

Figure 6:
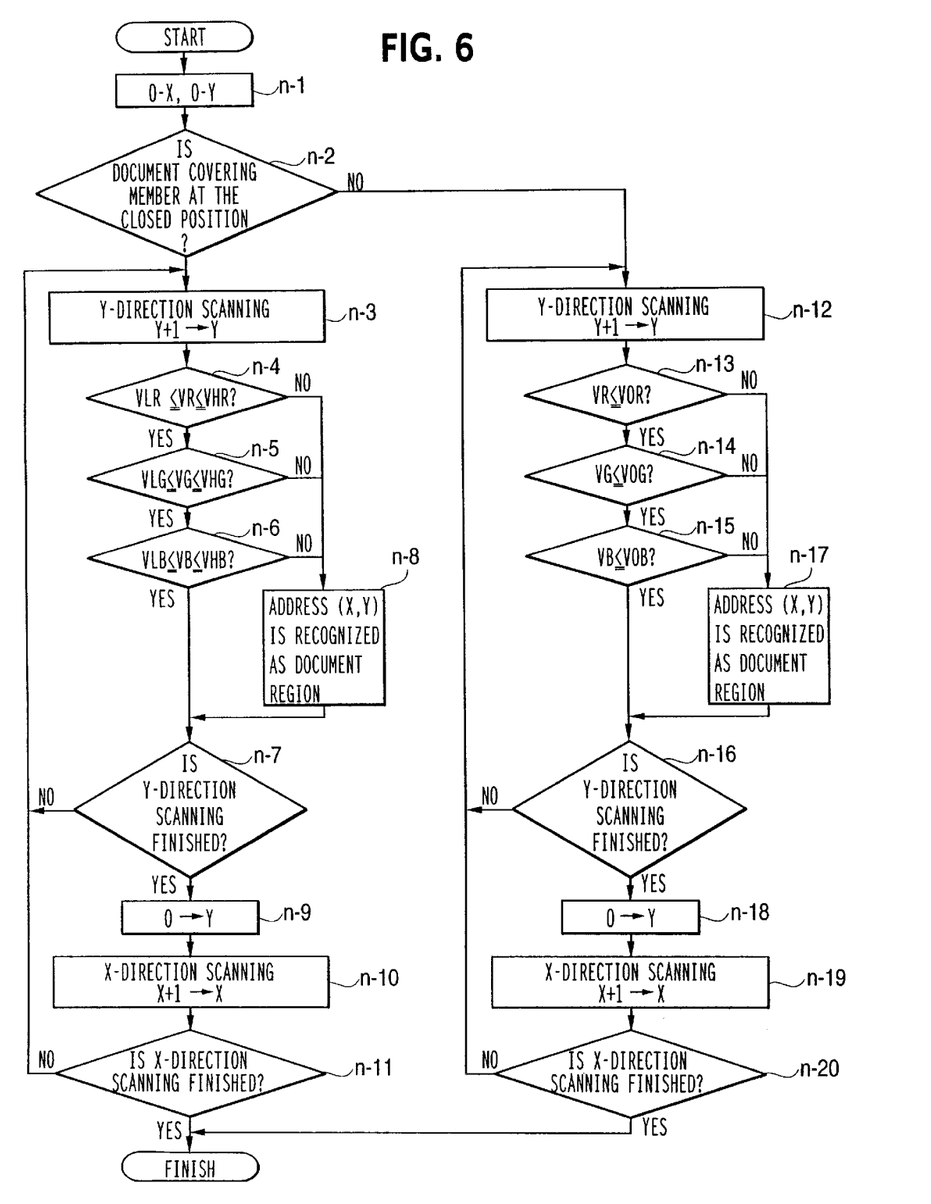
FIG. 6 is a flow chart illustrating the process for detecting the document in the copying machine of FIG. 1.

Description will be continued with reference to a flow chart for detecting the document shown in FIG. 6. When a copy start switch (not shown) is depressed for starting the step of copying, the document scanning is started. At a step n-1, the addresses in the main scanning direction and in the subscanning direction are initialized. In the diagramed embodiment, provision is also made of a known document covering means detecting means 30 (FIG. 4) which detects whether the document covering means 6 is located at the closed portion shown in FIGS. 1 and 2 or not. At a step n-2, it is determined whether the document cover 6 is located at the closed position. When the document covering means 6 is located at the closed position, the program proceeds to a step n-3 where the address is advanced by one in the main scanning direction Y (in the main scanning direction Y, an address is constituted by a set of three elements, i.e., R element 14R, G element 14G and B element 14B, of the image sensor 14). At a step n-4, voltage VR fed from the R element 14R of the image sensor 14 to the comparator 26R is compared with VHR and VLR that are fed to the comparator 26R from the R reference voltage setting circuit 28R. In the case when VLR≦VR≦VHR, the program proceeds to a step n-5 where voltage VG fed from the G element 14G of the image sensor 14 to the comparator 26G is compared with VHG and VLG that are fed to the comparator 26G from the G reference voltage setting circuit 28G. In the case of VLG≦VG≦VHG, the program proceeds to a step n-6 where voltage VB fed from the B element 14B of the image sensor 14 to the comparator 26B is compared with VHB and VLB fed to the comparator 26B from the B reference voltage setting circuit 28B. In the case of VLB≦VB≦VHB, the program proceeds to a step n-7 where it is discriminated whether the scanning in the main scanning direction Y is finished or not (i.e., whether a predetermined number of addresses are advanced repetitively or not). If the scanning is not finished in the main scanning direction, the program returns to the step n-3. When VR is smaller than VLR or VHR is smaller than VR in the above step n-4, the program proceeds to a step n-8 where a particular address is recognized as a region where the document exists, and the program proceeds to the step n-7. When VG is smaller than VLG or VHG is smaller than VG in the above step n-5, the program also proceeds to the step n-8. In the step n-8, the particular address is recognized as a region where the document exists, and the program proceeds to the above step n-7. The program also proceeds to the step n-8 when VB is smaller than VLB or VHB is smaller than VB in the above step n-6. In this step n-8, the particular address is recognized as the region where the document exists, and the program proceeds to the above step n-7. When the scanning has been finished in the main scanning direction Y in the above step n-7, the program proceeds to a step n-9 where the address is initialized in the main scanning direction. Next, the program proceeds to a step n-10 where the address is advanced by one in the subscanning direction X. The program then proceeds to a step n-11 where it is discriminated whether the scanning is finished in the subscanning direction X or not. When the scanning is not finished in the subscanning direction, the program returns to the step n-3. Thus, the steps n-4, n-5 and n-6 execute discriminations in many addresses, i.e., in many regions in the main scanning direction Y and in the subscanning direction X. At a step n-11, the flow for detecting the document is finished when the scanning has been finished in the subscanning direction. Then, the copying machine executes the subsequent steps, for example, for forming color images.

When the document covering means 6 is located at the closed position, therefore, it is discriminated that no document exists on the region only when the conditions VLR≦VR≦VHR, VLG≦VG≦VHG and VLB≦VB≦VHB are all satisfied. When any one of the above three conditions is not satisfied, it is discriminated that the document exists in the region. When there exists no document and in consequence, the light irregularly reflected by the document covering surface 24 of the document covering means 6 is received by the image sensor 14, the above three conditions are all satisfied. According to the analysis by the present inventors, some of the above-mentioned three conditions are not satisfied for nearly all documents when the light irregularly reflected by the document 4 placed on the transparent plate 2 is received by the image sensor 14. Thus, the region where the document 4 exists and the region where no document exists are discriminated without error, making it possible to detect the document reliably.

On the other hand, when the document is a given page of a relatively thick book, the copying machine may often be operated with the document cover 6 being maintained at the open position instead of being brought to the closed position. In this case, the program proceeds to a step n-12 from the step n-2. At the step n-12, the address is advanced by one in the main scanning direction Y. At a step n-13, a voltage VR fed from the R element 14R in the image sensor 14 to the comparator 26R is compared with VOR that is fed from the R reference voltage setting circuit 28R to the comparator 26R. In the case of VR$\leq$VOR, the program proceeds to a step n-14 where a voltage VG fed from the G element 14G of the image sensor 14 to the comparator 26G is compared with VOG that is fed to the comparator 26G from the G reference voltage setting circuit 28G. In the case of VG$\leq$VOG, the program proceeds to a step n-15 where a voltage VB fed from the B element 14B in the image sensor 14 to the comparator 26B is compared with VOB that is fed to the comparator 26B from the B reference voltage setting circuit 28B. In the case of VB$\leq$VOB, the program proceeds to a step n-16 where it is discriminated whether the scanning in the main scanning direction Y is finished or not. If the scanning in the main scanning direction is not finished, the program returns to the above step n-12. When the condition VOR<VR is satisfied in the step n-13, the program proceeds to a step n-17 where a particular address is recognized as the region where the document exists, and the program proceeds to the above step n-16. When the condition VOG<VG is satisfied in the above step n-14, the program proceeds to the step n-17 where the particular address is recognized as the region where the document exists and the program proceeds to the above step n-16. When the condition VOB<VB is satisfied in the above step n-15, the program proceeds to the step n-17 where the particular address is recognized as the region where the document exists, and the program proceeds to the step n-16. When the scanning in the main scanning direction Y has been finished in the step n-16, the program proceeds to a step n-18 where the address is initialized in the main scanning direction. The program then proceeds to a step n-19 where the address is advanced by one in the subscanning direction X. Then the program proceeds to a step n-20 where it is discriminated whether the scanning is finished in the subscanning direction X or not. When the scanning is not finished in the subscanning direction, the program proceeds to the step n-12. Thus, the steps n-13, n-14 and n-15 execute discrimination in many addresses, i.e., in many regions in the main scanning direction Y and in the subscanning direction X. At a step n-20, the flow for detecting the document is finished when the scanning has been finished in the subscanning direction. Then, the copying machine executes the subsequent steps, for example, for forming color images.

When the document covering means 6 is not located at the closed position but is located at the open position, therefore, it is discriminated that no document exists in the region only when the conditions VR$\leq$VOR, VG$\leq$VOG and VB$\leq$VOB are all satisfied. When any one of the above three conditions is not satisfied, it is discriminated that the document exists in the region. When there is document and so the light from the document illumination source 10 passes through the transparent plate 2 almost without being reflected, the image sensor 14 receives almost no irregular reflection light, and the above-mentioned three conditions are all satisfied. On the other hand, when the image sensor 14 receives the light irregularly reflected by the document 4 that is placed on the transparent plate 2, some of the above-mentioned three conditions are not satisfied for the ordinary documents. Thus, the region where the document 4 exists and the region where no document exists are discriminated, making it possible to detect the document. However, as mentioned already, when the document 4 contains a so-called solid portion which is black all over or when the document 4 is an ordinary photograph having dark color portion in the background of the subject, the image sensor 14 receives very little light that is irregularly reflected from such portions, and in consequence, the aforementioned three conditions are satisfied. Accordingly, in the case where the document covering means 6 is not located at the closed position, when the document 4 includes a solid region or when the document 4 is an ordinary photograph, there remains the probability that the document-existing region might be erroneously discriminated to be the no document-existing region.

In the aforementioned embodiment, the document-scanning process is performed by utilizing the image reader scanning unit 8 that reads the image of the document 4. As required, however, it is allowable to detect the document by providing a lens means designed exclusively for detecting the document and an image sensor, separately from the lens array 12 and the image sensor 14 in the image reader scanning unit 8, as disclosed in Japanese Laid-Open Patent Publication Nos. 68728/1984 and 41842/1988 mentioned earlier.

Though the document covering means 6 is constituted by an ordinary document covering member in the diagramed embodiment, it can be understood without needing detailed description that the present invention can also be adapted to the case where the document covering means is constituted by a portion of the document carrier means, as disclosed in Japanese Laid-Open Patent Publication No. 41842/1984.

According to the present invention which employs the document covering means having a document covering surface with particular characteristics, there is no likelihood of erroneously discriminating the document covering surface of the document covering means from the surface of a document, and the document can be detected fully reliably.

Furthermore, even when the document covering means is not located at the closed position, the document can be detected though there remains the probability of erroneous discrimination like in the conventional case.

What I claim is:

1. An image processor comprising a transparent plate adapted to have a document placed thereon, document cover for covering said transparent plate and the document thereon, document illumination source adapted for movement relative to the document on said transparent plate, an image sensor for receiving light irregularly reflected from the document illuminated by said document illuminating means, and document detecting means for detecting the document-existing region of the transparent plate on the basis of an output signal from said image sensor, said document covering means having a substantially achromatic document covering surface with a regular reflectance of from 1.5 to 20% and giving a relative intensity of irregularly reflected light as received by said image sensor of from N4 to N8.5 in terms of lightness in the Munsell color system.

2. An image processor according to claim 1, wherein said document covering surface of said document cover has a regular reflectance of from 2 to 15%.

3. An image processor according to claim 1, wherein said document covering surface of said document cover gives a relative intensity of irregularly reflected light as received by said image sensor of from N5.5 to N7.5 in terms of lightness in the Munsell color system.

4. An image processor according to claim 1, wherein said image sensor is a CCD, and wherein said document detecting means discriminates that a document exists on the region of the transparent plate when the output voltage of said image sensor lies outside a predetermined range.

5. An image processor according to claim 4, wherein said CCD includes R elements for receiving red light, G elements for receiving green light, and B elements for receiving blue light.

6. An image processor according to claim 4, wherein said CCD includes a number of elements arranged in a predetermined direction, and said document illumination means moves relative to the document in a direction perpendicular to said predetermined direction.

7. An image processor according to claim 5, wherein said document detecting means discriminates that a document exists on the region of the transparent plate only when the output voltages of all of the R elements, the G elements, and the B elements lie outside the predetermined range.

8. An image processor according to claim 1, wherein said document covering means includes a document covering means member and a film adhered to said document covering means member to provide said substantially achromatic document covering surface.

9. An image processor according to claim 8, wherein said film is a cancellation marked film.

10. An image processor according to claim 8, wherein said film is a hair lined film.

11. An image processor comprising a transparent plate adapted to have a document placed thereon, a document cover adapted to freely move between a closed position at which said document covering means covers said transparent plate and the document placed thereon and an open position at which said document covering means permits said transparent plate to be exposed, a document covering means detecting means for detecting whether said document covering means is located at said closed position or not, a document illumination source adapted to move relative to the document on said transparent plate, an image sensor for receiving light irregularly reflected by the document illuminated by said document illumination means, and a document detecting means for detecting the document-existing region of the transparent plate based on an output signal from said image sensor, said document cover having a substantially achromatic document covering surface with a regular reflectance of from 1.5 to 20% and giving a relative intensity of irregularly reflected light as received by said image sensor of from N4 to N8.5 in terms of lightness in the Munsell color system, and said document detecting means detecting whether a document exists on the region of the transparent plate or not in a different manner depending upon whether said document covering means is at said closed position or at said open position.

12. An image processor according to claim 11, wherein said image sensor is a CCD, and said document detecting means discriminates that a document exists on the region of said transparent plate when the output voltage of said image sensor lies outside a predetermined range when said document covering means is located at said closed position, and discriminates that a document exists on the region of said transparent plate when the output voltage of said image sensor is greater than a predetermined value when said document cover is not located at said closed position.

13. An image processor according to claim 12, wherein said predetermined value of output voltage of said image sensor is lower than said predetermined range of output voltage of said image sensor.

14. An image processor according to claim 12, wherein said CCD includes R elements for receiving red light, G elements for receiving green light, and B elements for receiving blue light.

15. An image processor according to claim 14, wherein said document detecting means discriminates that a document exists on the region of the transparent plate only when the output voltages of all of the R elements, the G elements, and the B elements lie outside the predetermined range when said document covering means is located at said closed position, and discriminates that a document exists on the region of the transparent plate only when the output voltages of all of the R elements, the G elements, and the B elements are greater than the predetermined value when said document covering means is not located at said closed position.

16. An image processor according to claim 12, wherein said CCD includes a number of elements arranged in a predetermined direction, and said document illumination means moves relative to the document in a direction perpendicular to said predetermined direction.

17. An image processor according to claim 10, wherein said document covering surface of said document cover has a regular reflectance of from 2 to 15%.

18. An image processor according to claim 11, wherein said document covering surface of said document cover gives a relative intensity of irregularly reflected light as received by said image sensor of from N5.5 to N7.5 in terms of lightness in the Munsell color system.

19. An image processor according to claim 11, wherein said document covering means includes a document covering means member and a film adhered to said document covering means member to provide said substantially achromatic document covering surface.

20. An image processor according to claim 19, wherein said film is a cancellation marked film.

21. An image processor according to claim 20, wherein said film is a hair lined film.

* * * * *